UNITED STATES PATENT OFFICE.

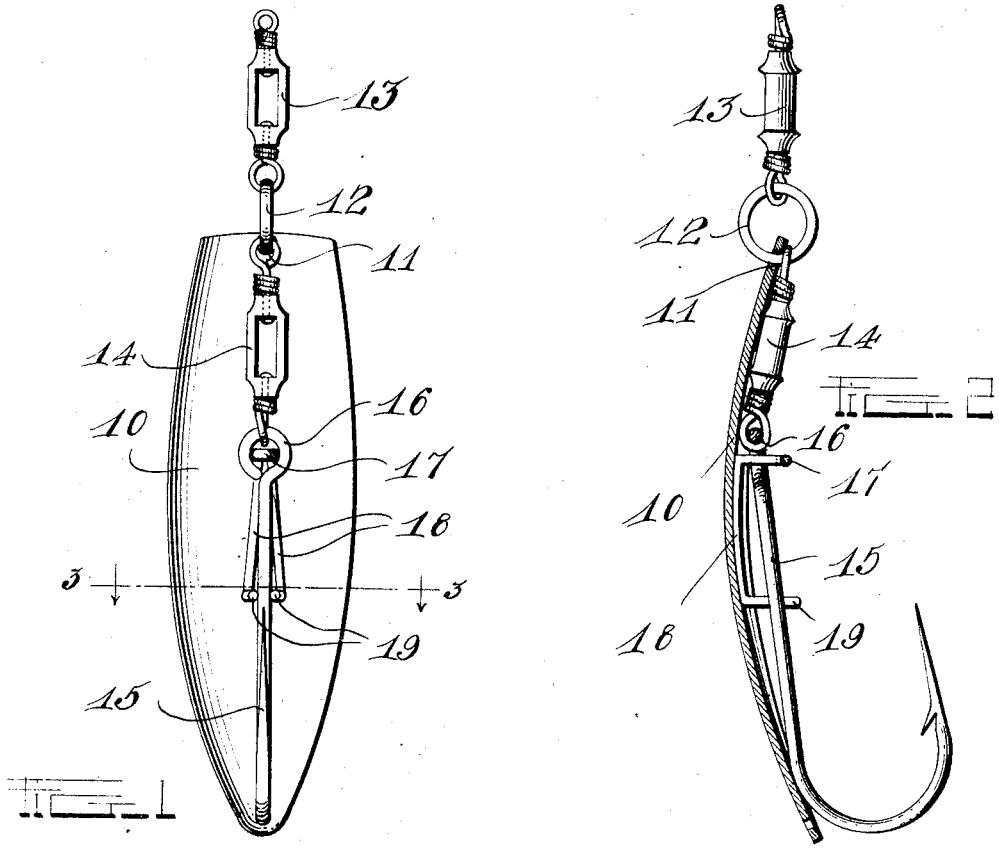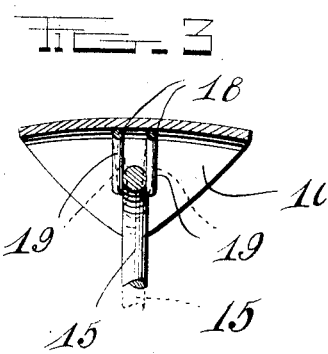

JESY E. BETTS AND CHARLES EWENS, OF KETCHIKAN, ALASKA; SAID BETTS ASSIGNOR TO C. E. LINDIG, OF KETCHIKAN, ALASKA.

SPOON-HOOK.

1,050,759.

Specification of Letters Patent.    Patented Jan. 14, 1913.

Application filed June 1, 1912. Serial No. 701,014.

*To all whom it may concern:*

Be it known that we, JESY E. BETTS and CHARLES EWENS, citizens of the United States, residing at Ketchikan, Alaska, have invented certain new and useful Improvements in Spoon-Hooks, of which the following is a specification, reference being had therein to the accompanying drawing.

This invention relates to fishing appliances and has special reference to an improved form of spoon.

The principal object of the invention is to provide an improved form of spoon wherein a hook will lie in the hollow of the spoon but disengage therefrom when a fish strikes it.

With the above and other objects in view as will be hereinafter apparent, this invention consists in general of certain novel constructions, combinations and arrangements of parts, as will be hereinafter fully described, illustrated in the accompanying drawings, and specifically claimed.

In the accompanying drawings, like characters of reference indicate like parts in the several views, and:—Figure 1 is a face view of the interior of the spoon. Fig. 2 is a longitudinal median section therethrough. Fig. 3 is a detail section on the line 3—3, of Fig. 1.

The spoon proper comprises an elongated cymbiform body 10 having at one end an opening 11 wherethrough passes a ring 12 to which is attached a swivel 13 of the ordinary type used in connection with devices of this description. To this swivel is intended to be attached the fishing line. Secured also to the ring 12 is a second similar swivel 14 the opposite end of which is attached to the hook 15. This hook 15 has an eye for attachment to the swivel.

Soldered or brazed to the body of the spoon on the hollow side is a holding device for the fish hook which consists preferably of a single length of wire bent centrally in a loop 17 adapted to pass through the eye 16. This loop projects substantially at right angles to the spoon and the wire is continued from the loop in portions 18 which lie along the spoon and diverge slightly as can clearly be seen in Fig. 1. The ends of the wire are bent upwardly as at 19 and incline toward each other. These ends are so arranged that their terminal portions are slightly closer together than the diameter of the steel from which the hook is made so that a small degree of force is necessary to place the hook with its shank between the two portions 19 or to release it therefrom. By this means the hook is held with its shank in the hollow of the spoon until such time as the fish strikes. Thereupon the hook pulls loose from the spoon and acts as in the ordinary manner.

There has thus been provided a simple and efficient device of the kind described, and for the purpose specified.

It is obvious that many minor changes may be made in the form and construction of the invention without departing from the material principles thereof and it is therefore not wished to confine the invention to the exact form herein shown and described, but it is wished to include all such as properly come within the scope of the appended claims.

Having thus described the invention, what is claimed as new, is:—

1. The combination with a spoon having a cymbiform elongated body provided with an opening at one end of a link passing through said opening, a line attaching swivel connected to said link, a second swivel connected to the link, a hook attached to the second swivel, and means in the hollow of the spoon to releasably engage the hook.

2. The combination with a spoon having a cymbiform elongated body provided with an opening at one end of a link passing through said opening, a line attaching swivel connected to said link, a second swivel connected to the link, a hook attached to the second swivel, said hook being provided with a shank and eye, a wire bent intermediate its ends to form a loop adapted to pass through said eye, said wire having portions adjacent the loop substantially at right angles and secured in the hollow of the spoon, and converging terminal portions formed on said wire and extending outward from the hollow of the spoon to form shank engaging means.

In testimony whereof we hereunto affix our signatures in presence of two witnesses.

JESY E. BETTS.
CHARLES EWENS.

Witnesses:
ANTON KALEEL,
CHAS. H. COSGROVE.